Figure 7:
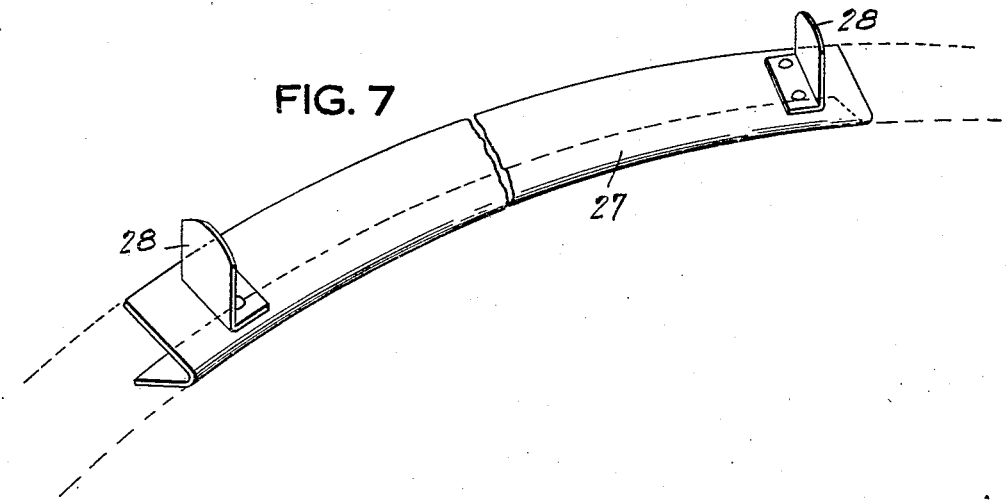

R. B. BOSTWICK.
VEHICLE WHEEL.
APPLICATION FILED JUNE 9, 1919.
1,363,951. Patented Dec. 28, 1920.
2 SHEETS—SHEET 1.
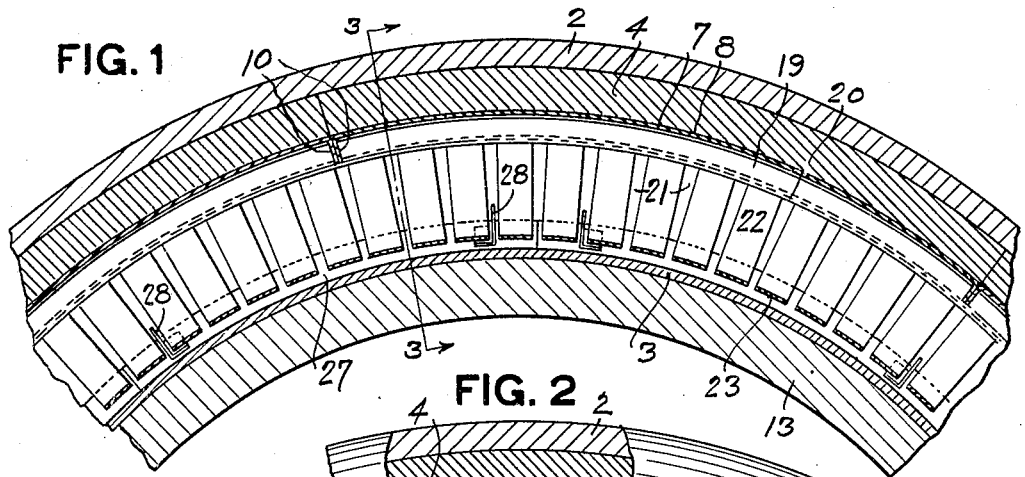
FIG. 1
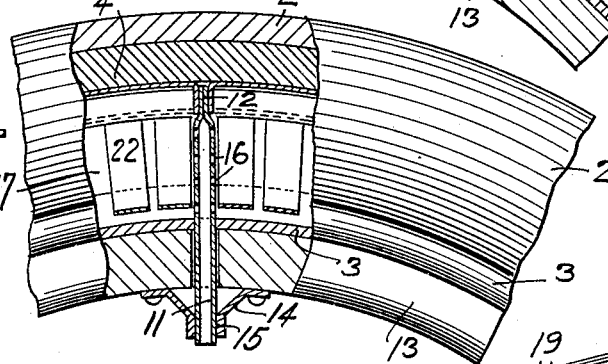
FIG. 2
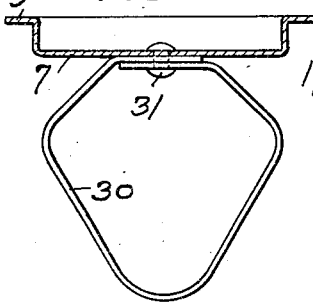
FIG. 6
FIG. 3
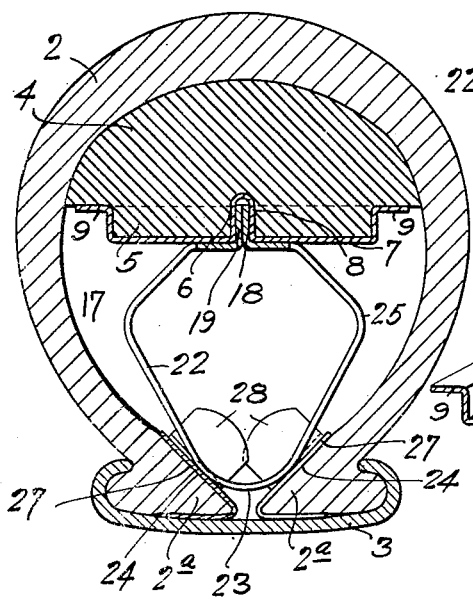
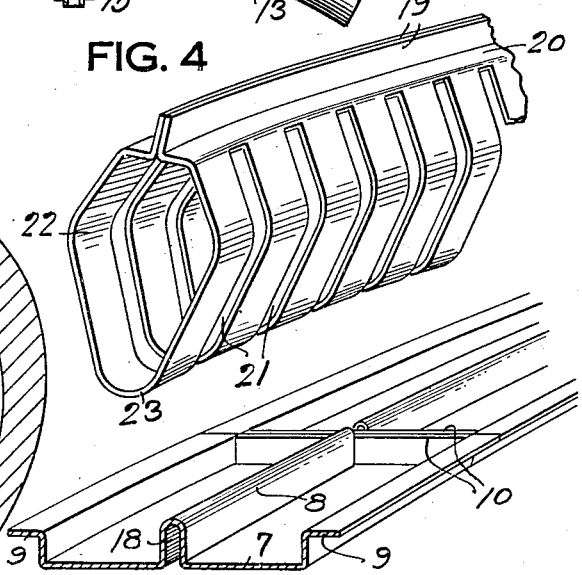
FIG. 4
FIG. 5
INVENTOR
Rollon B. Bostwick
By May Totten Powell
attys

R. B. BOSTWICK.
VEHICLE WHEEL.
APPLICATION FILED JUNE 9, 1919.

1,363,951.

Patented Dec. 28, 1920.
2 SHEETS—SHEET 2.

INVENTOR
Rolla B. Bostwick
By Kay Totman Powell
attys

UNITED STATES PATENT OFFICE.

ROLLA B. BOSTWICK, OF DUQUESNE, PENNSYLVANIA.

VEHICLE-WHEEL.

1,363,951.

Specification of Letters Patent.

Patented Dec. 28, 1920.

Application filed June 9, 1919. Serial No. 302,852.

*To all whom it may concern:*

Be it known that I, ROLLA B. BOSTWICK, a citizen of the United States, and resident of Duquesne, in the county of Allegheny and State of Pennsylvania, have invented a new and useful Improvement in Vehicle-Wheels; and I do hereby declare the following to be a full, clear, and exact description thereof.

My invention relates to vehicle tires.

The object of my invention is to provide a resilient tire to take the place of the pneumatic tire now in general use, and thereby obviate the difficulties due to punctures and blow-outs as well as the great expense, due to such occurrences. A further object of my invention is to provide a very strong and durable tire giving the required resiliency and yet capable of withstanding the severe wear and tear to which said tires are subjected.

To these ends my invention consists in the novel construction hereinafter set forth and claimed.

In the accompanying drawing Figure 1 is a longitudinal sectional view of a portion of my improved tire; Fig. 2 is a side view of a portion of the tire partly broken away showing the air vent; Fig. 3 is an enlarged cross-section on the line 3—3, Fig. 1; Fig. 4 is a perspective view of a portion of the internal spring support; Fig. 5 is a perspective view of the retaining plate; Fig. 6 shows a modified form of my invention; and Fig. 7 is a perspective view of one section of the wear-plate.

In the drawing the numeral 2 designates a tire casing or shoe which may be formed of any suitable material having the necessary strength and toughness to stand the wear, said casing being of the ordinary clencher type with its free edges 2ª secured within the rim 3.

Within the casing 2 and forming a reinforcement for the tread portion is the reinforcement 4 which may be formed of sections of rubber, or a composition of rubber and canvas, and said reinforcement may be either a separate piece or may be formed integral with the casing as desired.

The reinforcement 4 has the rib 5 with the slot 6 formed therein. A retainer plate 7 formed of metal of a suitable gage is adapted to fit over the rib 5, said plate having the inwardly extending fin 8 which enters the slot 6 in the rib 5. Flanges 9 at the outer edges of the plate 7 bear against the reinforcement 4 and give strength and rigidity to said retaining plate. The retaining plate 7 is preferably made in sections as indicated in Fig. 5, each section being provided with the end portions 10.

A vent pipe 11 has the flattened inner end portion 12 which is adapted to be secured between the end portions 10 of adjoining sections of the retaining plate by riveting or otherwise, and said vent pipe extends through the rim 3 and felly 13. A bracket 14 is mounted on the felly 13, said bracket having the bearing 15 through which the pipe 11 extends, and said pipe is adapted to move back and forth in said bearing. The pipe 11 is provided with the apertures 16 which communicate with the space 17 within the casing, and in this way the interior of the casing is brought in communication with the atmosphere and is properly vented to permit the escape of the hot air.

The fin 8 of the retaining plate 7 is formed by bending the metal inwardly to form a groove 18, and this groove receives the fin 19 formed on the supporting spring member 20. This supporting spring member 20 as shown in Fig. 4 may be made of a single piece of sheet metal having the proper resiliency and strength. The slots 21 are cut in the metal and when the metal is bent up into the form shown in Fig. 4, individual spring members 22 are provided, said spring sections being ring-like in shape so that when the fin 19 is inserted in the groove 18 of the retaining plate, the inner ends 23 of said springs will fit between the separated free edges of the casing and will bear against the inner face of the casing at opposite points 24. The springs may be bulged as at 25 but do not bear against the inner walls of the casing 2, the only bearing points with the inner faces of said casing being at 24. The springs 22 are made of steel of sufficient rigidity so that when the wheel is under a load, said springs will only have point contact with the inner walls of the casing adjacent the free edges 2ª, and support the tire while still giving sufficient resilience to get practically the full effect of a pneumatic tire.

The wear-plates 27 fit around the free edges 2ª of the casing and the springs 22 bear against said plates at points 24, said wearing-plates thus relieving the wear which would take place if said springs were in direct contact with the material of which the casing is composed. In this manner by the use of these wear-plates I protect the casing against wear due to friction and so increase its life.

The wear-plates 27 are preferably made in sections and said plates have the inwardly projecting lugs 28 which enter the spaces or slots 21 between the springs 22 and in this manner the circumferential shifting or creeping of said plates is avoided.

It will be apparent that the pipe 11 will also have the effect of preventing the circumferential creeping of the springs.

In assembling the tire on the rim the reinforcement 4 and the spring members 22 are inserted in the shoe together with the wear plates 27 whereupon the free edges 2ª of the shoe are sprung in the rim the parts yielding sufficiently to permit of so doing.

In Fig. 6, I have illustrated a modified form of my invention in which the spring 30 is riveted by the rivet 31 to the retaining plate and in this case the springs are made of individual pieces of metal and not cut out of a sheet of metal as illustrated in Fig. 4.

What I claim is:

1. In a vehicle tire, the combination with a suitable rim of a suitable casing or shoe with its free edges secured by said rim, a reinforcement within said casing adjacent the tread portion, ring-like spring-members interposed between said reinforcement and the inner walls of said casing bearing at opposite points thereon adjacent the free edges of said casing, and otherwise spaced from the inner walls of said casing.

2. In a vehicle tire, the combination with a suitable rim of a suitable casing or shoe with its free edges secured by said rim, a reinforcement within said casing adjacent the tread portion, ring-like spring members interposed between said reinforcement and the inner walls of said casing bearing at opposite points thereon adjacent the free edges of said casing, and otherwise spaced from the walls of said casing, means for preventing the shifting of said springs.

3. In a vehicle tire, the combination with a suitable rim, of a suitable casing or shoe with its free edges secured by said rim, a reinforcement within said casing adjacent the tread portion, a retainer plate engaging said reinforcement, ring-like spring members connected to said retaining plate, said ring-like members bearing at two opposite points on the inner walls of said casing adjacent the free edges of said casing, said spring members being otherwise spaced from the inner walls of said casing.

4. In a vehicle tire, the combination with a suitable rim, of a casing or shoe with its free edges secured by said rim, a reinforcement within said casing adjacent the tread portion, a retainer plate engaging said reinforcement, said retainer plate having a slot formed therein, an internal spring support comprising a fin adapted to enter said slot, and ring-like spring members connected thereto, said ring-like members having bearing contact at two opposite points on the inner walls of said casing adjacent the free edges of said casing and otherwise spaced therefrom.

5. In a vehicle tire, the combination with a suitable rim of a suitable casing or shoe with its free edges secured by said rim, a reinforcement within said casing adjacent the tread portion, a rib formed on said reinforcement, a slot formed in said rib, a retainer plate, a fin on said retainer plate engaging said slot, an internal spring support comprising a fin adapted to enter a groove formed in said plate, and ring-like members, said members bearing at opposite points against the inner walls of said casing adjacent the free edges of said casing, and otherwise spaced therefrom.

6. In a vehicle tire, the combination with a suitable rim, of a suitable casing or shoe with its free edges secured by said rim, internal supporting means, a pipe secured within said casing having apertures communicating therewith, said pipe extending outside said casing and movable in and out relatively to said casing.

7. In a vehicle tire, the combination with a suitable rim of a suitable casing or shoe with its free edges secured by said rim, a reinforcement on the inside of said casing adjacent the tread-portion, spring members interposed between said reinforcement and the inner walls of said casing bearing at opposite points thereon adjacent the free edges of said casing, and wear plates interposed between said spring members and said casing.

8. In a vehicle tire, the combination with a suitable rim of a suitable casing or shoe with its free edges secured by said rim, a reinforcement on the inside of said casing adjacent the tread portion, spring members interposed between said reinforcement and the inner walls of said casing bearing at opposite points thereon adjacent the free edges of said casing, and wear-plates engaging the free edges of said casing.

9. In a vehicle tire, the combination with a suitable rim of a suitable casing or shoe with its free edges secured by said rim, a reinforcement within said casing adjacent the tread-portion, spring members interposed between said reinforcement and said casing bearing at opposite points thereon adjacent the free edges of said casing, wear-plates interposed between said spring members and said casing, and projections on said wear-plates extending into the spaces between said spring members.

10. In a vehicle-tire, the combination with a suitable rim of a suitable casing or shoe with its free edges secured by said rim, a reinforcement on the inside of said casing adjacent the tread-portion, spring members interposed between said reinforcement and the inner walls of said casing and bearing at points thereon adjacent the free edges of said casing, and means for holding said spring members against circumferential movement.

11. In a vehicle tire the combination with a suitable rim of a suitable casing or shoe with its free edges secured by said rim, a reinforcement on the inside of said casing adjacent the tread portion, a retainer plate engaging said reinforcement, ring-like spring members connected to said retainer plate and bearing against the inner walls of said casing, a felly, a vent pipe secured to said retainer plate passing through said rim and said felly.

12. In a vehicle tire the combination with a suitable rim of a suitable casing or shoe with its free edges secured by said rim, a reinforcement on the inside of said casing adjacent the tread portion, a supporting member interposed between said reinforcement and the inner walls of said casing bearing at opposite points thereon adjacent the free edges of said casing, and wear plates interposed between said supporting member and said casing.

In testimony whereof I, the said ROLLA B. BOSTWICK, have hereunto set my hand.

ROLLA B. BOSTWICK.

Witnesses:
 JOHN F. WILL,
 J. R. KELLER.